(12) United States Patent
Pietarinen

(10) Patent No.: US 11,434,442 B2
(45) Date of Patent: Sep. 6, 2022

(54) BIODIESEL COMPOSITION

(71) Applicant: UPM-Kymmene Corporation, Helsinki (FI)

(72) Inventor: Suvi Pietarinen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 17/289,026

(22) PCT Filed: Oct. 28, 2019

(86) PCT No.: PCT/FI2019/050764
§ 371 (c)(1),
(2) Date: Apr. 27, 2021

(87) PCT Pub. No.: WO2020/089521
PCT Pub. Date: May 7, 2020

(65) Prior Publication Data
US 2021/0403820 A1 Dec. 30, 2021

(30) Foreign Application Priority Data
Oct. 31, 2018 (FI) ...................................... 20185919

(51) Int. Cl.
| C10L 1/198 | (2006.01) |
| C10L 1/18 | (2006.01) |
| C07G 1/00 | (2011.01) |
| C10L 1/02 | (2006.01) |

(52) U.S. Cl.
CPC .............. *C10L 1/198* (2013.01); *C07G 1/00* (2013.01); *C10L 1/026* (2013.01); *C10L 1/1802* (2013.01); *C10L 2200/0476* (2013.01); *C10L 2230/081* (2013.01); *C10L 2270/026* (2013.01); *C10L 2290/24* (2013.01)

(58) Field of Classification Search
CPC ......... C07G 1/00; C10L 1/026; C10L 1/1802; C10L 1/198; C10L 2200/0476; C10L 2230/081; C10L 2270/026; C10L 2290/24
See application file for complete search history.

(56) References Cited

U.S. PATENT DOCUMENTS

2011/0082062 A1* 4/2011 Habeeb ...................... C10L 1/10
508/463
2014/0275501 A1* 9/2014 Capanema ................ C07G 1/00
530/500

FOREIGN PATENT DOCUMENTS

| WO | 2012049375 A1 | 4/2012 | |
| WO | 2015199608 A1 | 12/2015 | |
| WO | WO-2015199608 A1 * | 12/2015 | ................ C10L 1/02 |
| WO | 2016204682 A1 | 12/2016 | |
| WO | 2017095316 A1 | 6/2017 | |

OTHER PUBLICATIONS

Finnish Search Report from Finnish Patent Application No. FI-20185919 dated May 10, 2019 (3 pages).
Gil-Lalaguna, N., et al. "Obtaining biodiesel antioxidant additives by hydrothermal treatment of lignocellulosic bio-oil," In: Fuel Processing Technology, May 27, 2017, vol. 166, 1-7, <DOI:10.1016/j.fuproc.2017.05.020>.
Kang, S., et al. "Effects of Lignins on Antioxidant Biodiesel Production in Supercritical Methanol," In: Energy Fuels May 31, 2011, vol. 25, 2746-2748, <DOI:10.1021/ef2004249>.
Chuck, C.J., et al. "Renewable biofuel additives from the ozonolysis of lignin," In: Bioresource Technology Jun. 22, 2013, vol. 143, 549-554, <DOI:10.1016/j.ijbiomac.2017.03.015>.
An, L., et al. "Fractionation of enzymatic hydrolysis lignin By sequential extraction for enhancing antioxidant performance," In: International Journal of Biological Macromolecules Mar. 7, 2017, vol. 99, 674-681, <DOI:10.16/j.ijbiomac.2017.03.015>.
Larson, R.A., et al. "Potential antioxidants for biodiesel from a softwood lignin pyrolyzate," In: Industrial Crops & Products Sep. 9, 2017, vol. 109, 476-482, <DOI:10.1016/j.indcrop.2017.08.053>.
Zhao, L. et al. "Improving antioxidant activity of lignin by hydrogenolysis," In: Industrial Crops & Products Sep. 11, 2018, vol. 125, 228-235, <DOI:10.1016/j.indcrop.2018.09.002>.
Aminzadeh, S., et al. "Membrane filtration of kraft lignin: Structural charactristics and antioxidant activity of the low-molecular-weight fraction," In: Industrial Crops & Products Dec. 7, 2017, vol. 112, (2018), 200-209, <DOI:10.1016/j.indcrop.2017.11.042>.
Sun, S., et al. "One-step process based on the order of hydrothermal and alkaline treatment for producing lignin with high yield and antioxidant activity," In: Industrial Crops & Products Apr. 24, 2018, vol. 119, 260-266. <DOI:10.1016/j.indcrop.2018.04.030>.
Cheng, S. et al. "Hydrothermal degradation of alkali lignin to bio-phenolic compunds in sub/supercritical ethanol and water-ethanol co-solvent," In: Polymer Degradation and Stability Apr. 4, 2012, vol. 97, 839-848, <DOI: 10.1016/j.polymdegradstab.2012.03.044>.
Chandrasekaran, S. et al. "Antioxidants from Slow Pyrolysis Bio-Oil of Birch Wood: Application for Biodiesel and Biobased Lubricants," In: ACS Sustainable Chemistry & Engineering Jan. 25, 2016, vol. 4, 1414-1421, <DOI: 10.1021/acssuschemeng.5b01302>.
Barsberg, S. et al. "Control of Lignin Solubility and Particle Formation Modulates Its Antioxidant Efficiency in Lipid Medium: An In Situ Attenuated Total Reflectance FT-IR Study," In: energy fuels Jun. 27, 2014, vol. 28, 4539-4544, <dx.doi.org/10.1021/ef500368x>.
International Search Report and Written Opinion for International Patent Application No. PCT/FI2019/050764, dated Jan. 15, 2020 (10 pages).

* cited by examiner

*Primary Examiner* — Ellen M McAvoy
*Assistant Examiner* — Chantel L Graham
(74) *Attorney, Agent, or Firm* — Nixon Peabody LLP

(57) ABSTRACT

A biodiesel composition comprising a stabilization agent is disclosed. The stabilization agent comprises depolymerized lignin having a weight average molecular weight of at least 360 g/mol and at most 5000 g/mol, and the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

13 Claims, No Drawings

BIODIESEL COMPOSITION

CROSS-REFERENCE TO RELATED APPLICATIONS

This application is a U.S. National Stage of International Application No. PCT/FI2019/050764, filed on Oct. 28, 2019, which claims priority to Finnish Patent Application No. FI 20185919, filed Oct. 31, 2018, both of which are hereby incorporated by reference in their entireties.

TECHNICAL FIELD

The present disclosure relates to a biodiesel composition. The present disclosure further relates to a method for producing a stabilization agent for a biodiesel composition and to a method for producing a biodiesel composition. The present disclosure further relates to a diesel fuel. The present disclosure further relates to the use of depolymerized lignin as a stabilization agent in a biodiesel composition.

BACKGROUND

Biodiesel is a common biofuel that can be used in diesel-powered vehicles. Biodiesel can be used in its pure form, but it is often used as a diesel additive to reduce levels of particulates, carbon monoxide, and hydrocarbons from diesel-powered vehicles. Biodiesel is composed of fatty acid methyl esters (FAME) produced from biological feedstock via transesterification reaction. Usually vegetable oils, waste cooking oils or animal fats are used as feedstocks. The properties and requirements for biodiesel are regulated by standards. The parameter that is monitored the most is the oxidation stability of biodiesel. Due to the composition of FAME and the number of double bonds and their position in the fatty acid chain in biodiesel, it is sensitive for oxidation reactions. Therefore, antioxidants are used in biodiesel production. Commercial antioxidants are usually made of fossil raw material. In biodiesel, mainly phenolic type antioxidants are used due to their cost, availability and performance. The inventor however has recognized a need to provide a biodiesel composition that would be purely formed of biobased materials.

SUMMARY

A biodiesel composition is disclosed. The biodiesel composition may comprise a stabilization agent. The stabilization agent may comprise depolymerized lignin having a weight average molecular weight (Mw) of at least 360 g/mol and at most 5000 g/mol. The TEAC value of the depolymerized lignin is at most 50% of the TEAC value of a corresponding lignin before having been depolymerized. The weight average molecular weight of the depolymerized lignin is at most 60% of the weight average molecular weight of the corresponding lignin.

A method for producing a stabilization agent for a biodiesel composition is disclosed. The method may comprise: providing lignin; and subjecting the lignin to a depolymerization process to obtain depolymerized lignin having a weight average molecular weight of at least 360 g/mol and at most 5000 g/mol, for increasing the antioxidant capacity of the lignin, wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

A method for producing a biodiesel composition comprising a stabilization agent is disclosed. The method may comprise combining the stabilization agent with biodiesel, and wherein the stabilization agent comprises depolymerized lignin having a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

A diesel fuel is disclosed. The diesel fuel may comprise the biodiesel composition as disclosed in the present specification.

Further is disclosed the use of depolymerized lignin as a stabilization agent in a biodiesel composition for reducing oxidation of the biodiesel composition, wherein the depolymerized lignin has a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

DETAILED DESCRIPTION

A biodiesel composition comprising a stabilization agent is disclosed. The stabilization agent may comprise depolymerized lignin having a weight average molecular weight of at least 360 g/mol and at most 5000 g/mol. The TEAC value of the depolymerized lignin is at most 50% of the TEAC value of a corresponding lignin before having been depolymerized. The weight average molecular weight of the depolymerized lignin is at most 60% of the weight average molecular weight of the corresponding lignin.

Further is disclosed a method for producing a stabilization agent for a biodiesel composition. The method may comprise: providing lignin; and subjecting the lignin to a depolymerization process to obtain depolymerized lignin having a weight average molecular weight of at least 360 g/mol and at most 5000 g/mol, for increasing the antioxidant capacity of the lignin, wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

Further is disclosed a method for producing a biodiesel composition comprising a stabilization agent, wherein the method comprises combining the stabilization agent with biodiesel, and wherein the stabilization agent comprises depolymerized lignin having a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

Further is disclosed a diesel fuel comprising the biodiesel composition as disclosed in the current disclosure. In one embodiment, the diesel fuel comprises at least 2 weight-%, or at least 5 weight-%, or at least 20 weight-%, or at least 50 weight-%, or at least 80 weight-%, or about 100 weight-%, of the biodiesel composition. In one embodiment, the diesel fuel comprises in addition to the biodiesel composition, hydrocarbon-based diesel or mineral diesel. In one embodiment, the diesel fuel comprises in addition to the biodiesel composition described in this disclosure, another biobased diesel.

Further is disclosed the use of depolymerized lignin as a stabilization agent in a biodiesel composition for reducing oxidation of the biodiesel composition, wherein the depolymerized lignin has a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin.

The inventor surprisingly found out that when the lignin molecules are depolymerized or degraded into smaller structures or oligomers one is able to increase the antioxidant potential or activity thereof. Without limiting to any specific theory about why depolymerization of lignin results in an increased antioxidant activity, it is to be considered that the depolymerization opens the macromolecular structure of lignin whereby the steric hindrances that usually disable reactive groups in lignin structures are removed. Thus, it may be considered that the reactive groups are more accessible for further reactions when the lignin is depolymerized. The increased antioxidant activity has the added utility of enabling the use of the depolymerized lignin as a stabilization agent in a biodiesel composition for inhibiting or reducing oxidation of the biodiesel. This may be considered to be a result of the lignin being more readily soluble in the biodiesel composition when being in depolymerized form.

In the context of this specification, the term "corresponding lignin" may refer to the same lignin molecule as the depolymerized lignin but before it has been depolymerized. The corresponding lignin can thus be considered as a reference lignin whose TEAC value is determined. The TEAC value of the corresponding lignin is compared with the TEAC value that is determined after the lignin has been depolymerized.

In one embodiment, the TEAC value of the depolymerized lignin is at most 40%, or at most 30%, or at most 20%, of the TEAC value of a corresponding lignin before having been depolymerized.

The trolox equivalent antioxidant capacity (TEAC) value is a value commonly used to indicate the antioxidant capacity of a sample. The TEAC value and thus the antioxidant capacity can be determined by the following α,α-diphenyl-β-picrylhydrazyl (DPPH) radical scavenging assay method: Samples (10 mg) for the DPPH assay are dissolved in methanol (2 ml) by vortexing (20 s) and when needed they are filtrated before preparation of further dilutions. The storage solution of DPPH radical (2,2'-diphenyl-1-picrylhydrazyl) is prepared by dissolving 23.8 mg/100 ml methanol. The solution is stored in dark (max 1 week) and before the analyzes it is diluted 1:5 with methanol. For determination of trolox IC50 value, six concentration levels between 1.29 and 12.9 µg/ml and a blank (methanol) are prepared in triplicate. DPPH solution (0.5 ml) is mixed into the calibration (trolox) solution as well as into the analytical samples (0.5 ml), which are then vortexed and let to stay for 30 minutes and thereafter the absorbance is measured at 515 nm. From the linear trolox curve (absorbance vs concentration), the point where the DPPH absorbance is half of the original is determined and the concentration of trolox (IC50, µg/ml) is calculated by using the equation of the curve. From the sample dilutions, two points enclosing 50% inhibition are selected and a regression line equation is used to calculate the exact IC50 values. Trolox equivalent antioxidant capacity (TEAC) values are calculated by dividing the sample IC50 by trolox IC50 values. Thus, a low IC50 value as well as a low TEAC value means high DPPH radical scavenging activity.

In one embodiment, the stabilization agent consists of or is made of depolymerized lignin. In one embodiment, the stabilization agent consists of or is made of depolymerized lignin having a weight average molecular weight of at least 360 g/mol and at most 5000 g/mol.

In one embodiment, the depolymerization process is a base catalyzed degradation process or an enzymatic depolymerization process.

In the context of this specification, the term "base catalyzed degradation process" may refer to a process, wherein the lignin is degraded or depolymerized by the use of an alkali at an elevated temperature. In one embodiment, such a temperature is 250-380° C., or 280-320° C. In one embodiment, the alkali comprises a hydroxide of an alkali metal. In one embodiment, the alkali is selected from a group consisting of sodium hydroxide, potassium hydroxide, and any combination thereof. In one embodiment, the alkali is sodium hydroxide.

In the context of this specification, the term "enzymatic depolymerization process" may refer to a process, wherein the lignin is degraded or depolymerized by the use of an enzyme. In one embodiment, the enzyme is a lignin oxidizing enzyme. In on embodiment, the enzyme is a laccase-derived enzyme. In one embodiment, the enzymatic depolymerization process is carried out in a water solution. In one embodiment, the water solution does not contain a solvent or catalyst.

The components and their precise amounts used for depolymerizing the lignin may vary and the choice of the different components and their amounts is within the knowledge of the skilled person based on this specification. The temperature and pH values can be controlled and adjusted if needed during the depolymerization process.

In one embodiment, the depolymerized lignin has a weight average molecular weight of 420-4000 g/mol, or 500-3600 g/mol, or 700-3000 g/mol.

The weight average molecular weight of lignin can be determined by using a high-performance size-exclusion chromatography. In one embodiment, the weight average molecular weight of the lignin is determined by using a high-performance size-exclusion chromatography in the following manner: Two parallel measurements are carried out. 0.1 M NaOH is used as an eluent. Calibration is done using Na-polystyrene sulfonate standards having a molecular weight of 1100-73900 g/mol. For quality control, standard quality kraft lignin and PSS molecular weight standard are used. The columns used are PSS MCX precolumns, 1000 Å and 100 000 Å separation columns filled with sulfonated styrene-divinylbenzene copolymer matrix. Isocratic run program is used. The run time is 45 minutes. The injection volume is 50 µl. The flux is 0.5 ml per minute. The temperature is 25° C. As a result of the chromatography, number average molecular weight (Mn), weight average molecular weight (Mw), peak molecular weight (Mp) and polydispersity index (PDI) values can be reported.

In one embodiment, the weight average molecular weight of the depolymerized lignin is at most 50%, or at most 40% of the weight average molecular weight of the corresponding lignin. The weight average molecular weight of the depolymerized lignin is decreased compared to the weight average molecular weight of the corresponding lignin.

In one embodiment, the biodiesel composition contains at most 15 ppm of sulphur, or at most 10 ppm of sulphur, or essentially no sulphur. The amount of sulphur present in the biodiesel composition can at least partly be affected by the selection of the type of lignin used for producing the biodiesel composition. The sulphur content can be determined according to standard ASTM D5453.

In the context of this specification, the term "lignin" may refer to lignin originating from any suitable lignin source. In one embodiment, the lignin is essentially pure lignin. By the expression "essentially pure lignin" should be understood as at least 70% pure lignin, or at least 90% pure lignin, or at least 95% pure lignin, or at least 98% pure lignin. In one embodiment, the essentially pure lignin comprises at most 30%, or at most 10%, or at most 5%, or at most 2%, of other components and/or impurities. Extractives and carbohydrates such as hemicelluloses can be mentioned as examples of such other components.

In one embodiment, the lignin contains less than 30 weight-%, or less than 10 weight-%, or less than 5 weight-%, or less than 2 weight-% of carbohydrates. The amount of carbohydrates present in lignin can be measured by high performance anion exchange chromatography with pulsed amperometric detector (HPAE-PAD) in accordance with standard SCAN-CM 71.

In one embodiment, the ash percentage of lignin is less than 7.5 weight-%, or less than 5 weight-%, or less than 3 weight-%. The ash content can be determined by carbonifying and quickly burning a lignin sample so that alkali salts are not melted before the organic matter has been burned (e.g. 20-200° C. for 30 minutes, after which temperature is adjusted to 200-600° C. for 1 h, and thereafter adjusting the temperature to 600-700° C. for 1 hour), and finally the lignin sample is ignited at 700° C. for 1 h. Ash content of a lignin sample refers to the mass that remains of the sample after burning and ignition, and it is presented as percent of the sample's dry content. In one embodiment, the lignin is technical lignin. In the context of this specification, the term "technical lignin" may refer to lignin that is derived from lignin in any biomass by any technical process. In one embodiment, technical lignin is lignin received from an industrial process.

In one embodiment, the lignin is selected from a group consisting of kraft lignin, steam explosion lignin, biorefinery lignin, supercritical separation lignin, hydrolysis lignin, flash precipitated lignin, biomass originating lignin, lignin from alkaline pulping process, lignin from soda process, lignin from organosolv pulping, lignin from alkali process, lignin from enzymatic hydrolysis process, and any combination thereof. In one embodiment, the lignin is wood based lignin. The lignin can originate from softwood, hardwood, annual plants or from any combination thereof.

In one embodiment, the lignin is Kraft lignin. By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12.

Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value. The precipitated lignin can be purified from inorganic impurities, hemicellulose and wood extractives using acidic washing steps. Further purification can be achieved by filtration.

In one embodiment, the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 μm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In one embodiment, the lignin is derived from an alkali process. The alkali process can begin with liquidizing biomass with strong alkali followed by a neutralization process. After the alkali treatment, the lignin can be precipitated in a similar manner as presented above.

In one embodiment, the lignin is derived from steam explosion. Steam explosion is a pulping and extraction technique that can be applied to wood and other fibrous organic material.

By "biorefinery lignin" is to be understood in this specification, unless otherwise stated, lignin that can be recovered from a refining facility or process where biomass is converted into fuel, chemicals and other materials.

By "supercritical separation lignin" is to be understood in this specification, unless otherwise stated, lignin that can be recovered from biomass using supercritical fluid separation or extraction technique. Supercritical conditions correspond to the temperature and pressure above the critical point for a given substance. In supercritical conditions, distinct liquid and gas phases do not exist. Supercritical water or liquid extraction is a method of decomposing and converting biomass into cellulosic sugar by employing water or liquid under supercritical conditions. The water or liquid, acting as a solvent, extracts sugars from cellulose plant matter and lignin remains as a solid particle.

In one embodiment, the lignin is derived from a hydrolysis process. The lignin derived from the hydrolysis process can be recovered from paper-pulp or wood-chemical processes.

In one embodiment, the lignin originates from an organosolv process. Organosolv is a pulping technique that uses an organic solvent to solubilize lignin and hemicellulose.

In one embodiment, the lignin is from an enzymatic hydrolysis process. Enzymatic hydrolysis is a process, wherein enzymes assist in cleaving bonds in molecules with the addition of elements of water. In one embodiment, the enzymatic hydrolysis comprises enzymatic hydrolysis of cellulose.

In the context of this specification, the term "biodiesel" may refer to the mono alkyl esters of long chain fatty acids derived from vegetable oils or animal fats. In one embodiment, the biodiesel is a fatty acid methyl ester (FAME) based biodiesel. Another corresponding term often used for "FAME" is rapeseed oil methyl ester (RME). The properties accepted for biodiesel are regulated by standards, e.g. ASTM D6751-07b.

In one embodiment, the biodiesel composition comprises 250-1000 ppm of the stabilization agent.

In one embodiment, the biodiesel composition comprises at most 1 weight-% of fossil carbon, or at most 0.5 weight-% of fossil carbon, or essentially no fossil carbon. In the context of this specification, the term "fossil carbon" may refer to carbon in fossil raw materials or petroleum-based raw materials. In one embodiment, the biodiesel composition is derived from biological material only. In such an embodiment, the biodiesel composition may contain only modern carbon. In the context of this specification, the term "modern carbon" may refer to the carbon in biomass or biological material. Plants and other forms of life metabolize 14C, which becomes part of all life and biological products. In contrast, petroleum-based carbon does not include a signature amount of 14C. Accordingly, petroleum-based raw materials and biomass-based materials may be distinguished based on their 14C content. The standard method ASTM-D6866 can be used for assessing the biobased content of materials to distinguish petroleum-based materials and biomass-based materials based on their 14C content.

The biodiesel composition described in the current application has the added utility of comprising a biobased stabilization agent comprising depolymerized lignin. The use of lignin has the added utility of enabling the production of a biodiesel composition that is composed of biological material only, i.e. a fully biobased biodiesel composition can be produced. Lignin is a biological component and the use of lignin has the added utility of enabling one to reduce the $CO_2$ emissions of a fuel. The use of depolymerized lignin as the stabilization agent in the biodiesel composition has the added utility of showing an increased antioxidant potential compared to the same lignin before it has been degraded into smaller structures. The depolymerized lignin can thus be used as antioxidant in a biodiesel composition. The stabilization agent has the added utility of containing solely modern carbon. Thus, the amount of biological components can be increased when using depolymerized lignin as stabilization agent in e.g. FAME.

EXAMPLES

Reference will now be made in detail to various embodiments.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

Example 1

Producing a Stabilization Agent for a Biodiesel Composition

In this example stabilization agents were produced and their antioxidant potential were determined.

The lignin used for this example was lignin derived from beech wood (*Fagus sylvatica*). The lignin used in this example was either derived from the alkali process or from the enzymatic hydrolysis process that are described above. The lignin used was determined, based on standard ISO 11885 (2009-06-22), to be sulphur free.

Two different depolymerization processes were used for degrading or depolymerizing the lignin, i.e. the lignin was subjected either to 1) a base catalyzed degradation process (BCD), or 2) an enzymatic depolymerization process. Lignin derived from the entzymatic hydrolysis process was subjected to the enzymatic depolymerization process and lignin derived from the alkali process was subjected to the base catalyzed degradation process.

The base catalyzed degradation of lignin was conducted in the presence of sodium hydroxide in hot compressed water at a temperature of 280-320° C. The concentration of sodium hydroxide in the lignin solution was set to 3 weight-% and the concentration of lignin in the lignin solution was set to 10 weight-%. Three different samples were prepared by adjusting the residence time to 5, 10 or 15 minutes. As a result the aryl-aryl-ether bonds (a-O-4, b-O-4, 4-O-5) of lignin were cleaved.

Degradation of lignin through the enzymatic depolymerization process was carried out in a water solution in the presence of a lignin oxidizing enzyme.

The weight average molecular weights as well as the TEAC values were measured for the lignin samples before being subjected to the depolymerization process and after the lignin samples had been subjected to the depolymerization process. The weight average molecular weights and the TEAC values were determined following the description given above. The results are indicated in the below table.

TABLE

Measuring results before and after the depolymerization process

| | Depolymerization process | |
|---|---|---|
| | base catalyzed degradation | enzymatic method |
| Weight average molecular weight | | |
| Mw (g/mol) before depolymerization | 9263 | 23127 |
| Mw (g/mol) after depolymerization | 2127 | 535 |
| Antioxidant capacity | | |
| TEAC value before depolymerization | 11.5 | 251 |
| TEAC value after depolymerization | 2.2 | 31 |

From the received results it can be seen that depolymerizing lignin such that its weight average molecular weight falls within the range of at least 360 g/mol and at most 5000 g/mol beneficially affects its antioxidant potential or capacity.

Example 2

Producing a Biodiesel Composition

In this example a biodiesel composition was produced by mixing FAME with the stabilization agent produced in example 1. The amount of the stabilization agent in the biodiesel composition was 500 ppm. The stabilization agent has an antioxidant capacity suitable for reducing or inhibiting oxidation of the FAME.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. A composition, a method, a fuel, or a use, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A biodiesel composition comprising a stabilization agent, wherein the stabilization agent comprises depolymerized lignin having a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin, wherein the corresponding lignin is the same lignin molecule as the depolymerized lignin but before it has been depolymerized.

2. The biodiesel composition of claim 1, wherein the TEAC value of the depolymerized lignin is at most 40% of the TEAC value of a corresponding lignin before having been depolymerized.

3. The biodiesel composition of claim 1, wherein the depolymerized lignin has a weight average molecular weight of 420-4000 g/mol.

4. The biodiesel composition of claim 1, wherein the weight average molecular weight of the depolymerized lignin is at most 50% of the weight average molecular weight of the corresponding lignin.

5. The biodiesel composition of claim 1, wherein the biodiesel composition contains at most 15 ppm of sulphur.

6. The biodiesel composition of claim 1, wherein the lignin that is depolymerized is technical lignin.

7. The biodiesel composition of claim 1, wherein the biodiesel is a fatty acid methyl ester based biodiesel.

8. The biodiesel composition of claim 1, wherein the biodiesel composition comprises 250-1000 ppm of the stabilization agent.

9. The biodiesel composition of claim 1, wherein the biodiesel composition comprises at most 1 weight-% of fossil carbon.

10. A method for producing a stabilization agent for a biodiesel composition, wherein the method comprises:
    providing lignin; and
    subjecting the lignin to a depolymerization process, being a base catalyzed degradation process or an enzymatic depolymerization process, to obtain depolymerized lignin having a weight average molecular weight of at least 360 g/mol and at most 5000 g/mol, for increasing the antioxidant capacity of the lignin, wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin, wherein the corresponding lignin is the same lignin molecule as the depolymerized lignin but before it has been depolymerized.

11. A method for producing a biodiesel composition comprising a stabilization agent, wherein the method comprises combining the stabilization agent with biodiesel, and wherein the stabilization agent comprises depolymerized lignin having a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin, wherein the corresponding lignin is the same lignin molecule as the depolymerized lignin but before it has been depolymerized.

12. A diesel fuel comprising the biodiesel composition of claim 1.

13. Use of depolymerized lignin as a stabilization agent in a biodiesel composition for reducing oxidation of the biodiesel composition, wherein the depolymerized lignin has a weight average molecular weight of at least 360 g/mol and at most 5000 g/mol, and wherein the TEAC value of the depolymerized lignin is at most 50% of the TEAC value of a corresponding lignin before having been depolymerized, and wherein the weight average molecular weight of the depolymerized lignin is at most 60% of the weight average molecular weight of the corresponding lignin, wherein the corresponding lignin is the same lignin molecule as the depolymerized lignin but before it has been depolymerized.

* * * * *